United States Patent
Okumura et al.

(10) Patent No.: US 7,276,881 B2
(45) Date of Patent: *Oct. 2, 2007

(54) PROTECTION METHOD, CONTROL CIRCUIT, AND BATTERY UNIT

(75) Inventors: Masafumi Okumura, Kawasaki (JP); Shigeo Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/260,177

(22) Filed: Oct. 28, 2005

(65) Prior Publication Data
US 2006/0049804 A1 Mar. 9, 2006

Related U.S. Application Data

(60) Continuation of application No. 10/206,065, filed on Jul. 29, 2002, now Pat. No. 6,989,652, which is a division of application No. 09/528,201, filed on Mar. 17, 2000, now Pat. No. 6,492,791.

(30) Foreign Application Priority Data

Mar. 18, 1999 (JP) ................. 11-074479

(51) Int. Cl.
*H02J 7/00* (2006.01)
(52) U.S. Cl. .................. 320/134; 320/135; 320/136; 320/162; 320/163
(58) Field of Classification Search ............ 320/134, 320/135, 136, 162, 163; 361/81, 88, 90, 361/91.1, 92
See application file for complete search history.

(56) References Cited

U.S. PATENT DOCUMENTS 5,155,428 A 10/1992 Kang (Continued)

FOREIGN PATENT DOCUMENTS

DE 93 19 881 U1 8/1994

(Continued)

OTHER PUBLICATIONS

Li Ni MH Nicd MAX 846 (Document in Chinese).

(Continued)

*Primary Examiner*—Karl Easthom
*Assistant Examiner*—Samuel Berhanu
(74) *Attorney, Agent, or Firm*—Arent Fox PLLC

(57) ABSTRACT

A protection method for preventing battery cells from over-discharging and being overcharged, a control circuit, and a battery unit are provided. In the protection method, when a set signal "1" is supplied to a set terminal, a flip-flop outputs "1". The gate of a discharge control FET then becomes "1", so that the discharge control FET is OFF regardless of a discharge control signal supplied from a voltage monitor circuit. When a reset signal "1" is supplied to a reset terminal, the flip-flop outputs "0". The discharge control FET is then switched on and off in accordance with the output of a discharge control circuit of the voltage monitor circuit. In this manner, battery cells connected to an electronic device do not over-discharge, even when they are left unused for a long period of time. Thus, the battery unit can be prevented from deteriorating and shortening the life thereof.

8 Claims, 12 Drawing Sheets

U.S. PATENT DOCUMENTS

| | | | |
|---|---|---|---|
| 5,304,915 A | 4/1994 | Sanpei et al. | |
| 5,477,130 A | 12/1995 | Hashimoto et al. | |
| 5,477,133 A | 12/1995 | Earle | |
| 5,493,197 A | 2/1996 | Eguchi et al. | |
| 5,547,775 A | 8/1996 | Eguchi et al. | |
| 5,612,616 A | 3/1997 | Earle | |
| 5,617,018 A | 4/1997 | Earle | |
| 5,619,126 A | 4/1997 | Lang | |
| 5,680,027 A | 10/1997 | Hiratsuka et al. | |
| 5,801,514 A | 9/1998 | Saeki et al. | |
| 5,808,444 A | 9/1998 | Saeki et al. | |
| 5,905,361 A | 5/1999 | Saeki et al. | |
| 5,963,019 A | 10/1999 | Cheon | |
| 6,008,629 A | 12/1999 | Saeki et al. | |
| 6,046,575 A | 4/2000 | Demuro | |
| 6,172,485 B1 | 1/2001 | Fujita et al. | |
| 6,181,108 B1 | 1/2001 | Sudo et al. | |
| 6,465,983 B1 | 10/2002 | Ogata et al. | |
| 6,492,791 B1 | 12/2002 | Saeki et al. | |
| 6,545,447 B1 * | 4/2003 | Smith | 320/132 |
| 6,885,168 B2 * | 4/2005 | Okumura et al. | 320/135 |
| 6,989,652 B2 * | 1/2006 | Saeki et al. | 320/134 |

FOREIGN PATENT DOCUMENTS

| | | |
|---|---|---|
| DE | 196 18 236 A1 | 12/1996 |
| DE | 36 11 484 A1 | 10/1997 |
| EP | 0 622 863 A1 | 11/1994 |
| GB | 2 279 802 A | 1/1995 |
| GB | 2 292 845 A | 3/1996 |
| GB | 2 308 024 A | 6/1997 |
| GB | 2 308 025 A | 6/1997 |
| GB | 2 308 026 A | 6/1997 |
| JP | 05003635 A | 1/1993 |
| JP | 5-81756 | 11/1993 |
| JP | 07-029554 | 1/1995 |
| JP | 08-079982 | 3/1996 |
| JP | 09-017455 | 1/1997 |
| JP | 09-050826 | 2/1997 |
| JP | 10215524 A | 8/1998 |
| JP | 11-242966 | 9/1999 |
| JP | 11-339862 | 12/1999 |
| WO | 94/10718 | 5/1994 |
| WO | 98/34316 | 8/1998 |

OTHER PUBLICATIONS

MAXIM Cost-Saving Multichemistry Battery-Charger System MAX846A, Maxim Integrated Products, Sunnyvale, CA, Sep. 1996, 12 pages.

* cited by examiner

PROTECTION METHOD, CONTROL CIRCUIT, AND BATTERY UNIT

CROSS-REFERENCE TO RELATED APPLICATION

This is a Continuation of application Ser. No. 10/206,065 filed Jul. 29, 2002 now U.S. Pat. No. 6,989,652, which in turn is a Divisional Application of parent application Ser. No. 09/528,201 filed Mar. 17, 2000, now U.S. Pat. No. 6,492,791 B1, issued Dec. 10, 2002. The disclosure of the prior applications is hereby incorporated by reference herein in its entirety.

BACKGROUND OF THE INVENTION

1. Field of the Invention

The present invention generally relates to a protection method, a control circuit, and a battery unit. More particularly, the present invention relates to a protection method for preventing batteries from over-discharging and being overcharged, and a control circuit and a battery unit both employed in said protection method.

In recent years, lithium ion (Li+) batteries have been replacing nickel-cadmium (NiCd) batteries and nickel-metal-hydrogen (NiMH) batteries in portable electronic devices such as notebook-type personal computers. Compared with the NiCd batteries and NiMH batteries, the Li+ batteries are lighter but have a larger capacity per unit volume. For this reason, the Li+ batteries are suitable for a device which is preferably light and required to endure continuous use for a long time.

In an over-discharged state, however, the Li+ batteries deteriorate rapidly. Therefore, the Li+ batteries need to be prevented from over-discharging.

2. Description of the Related Art

A battery unit used in a portable electronic device has a plurality of battery cells connected in series. The maximum number of battery cells connected in series in one battery unit is determined by the relationship between the output voltage of the battery unit and a power source voltage supplied from outside at the time of charging. For instance, the output voltage of one NiCd battery cell or one NiMH battery cell is 1.2 V, and the power source voltage supplied at the time of charging is approximately 1.7 V. Since a 16-V output voltage of a battery unit is the most suitable for a general purpose electronic device, the maximum number of NiCd or NiMH battery cells connected in series in the battery unit is 9. On the other hand, the highest possible output voltage of one Li+ battery cell is approximately 4.2 V. Accordingly, the maximum number of Li+ battery cells connected in series in one battery unit is 3.

Unlike a NiCd battery unit and a NiMH battery unit, the Li+ battery unit has a function to protect against short-circuiting inside and outside the Li+ battery unit. This prevents the Li+ battery unit from deteriorating and shortening its life. For instance, if short-circuiting occurs inside or outside the Li+ battery unit, a fuse cuts off an over-discharging current or overcharging current when the discharging current or charging current becomes larger than a predetermined current value. Thus, the LI+ battery unit is prevented from deteriorating and shortening its life.

FIG. 1 is a block diagram of an example battery unit of the prior art, and FIG. 2 is a circuit diagram of a voltage monitor circuit of the example battery unit of the prior art.

In FIGS. 1 and 2, a battery unit 100 comprises battery cells E1, E2, and E3 connected as shown in the figures, a voltage monitor circuit 101, a fuse 102, p-channel FETs 103 and 104, and power supply terminals 105 and 106.

The battery cells E1, E2, and E3 are connected in series. The FET 103 is a charge control FET which functions as a charge control switch. The FET 104 is a discharge control FET which functions as a discharge control switch. The voltage monitor circuit 101 monitors the voltages of the battery cells E1, E2, and E3. In accordance with the respective voltages of the battery cells E1, E2, and E3, the voltage monitor circuit 101 switches on and off the FETs 103 and 104.

As shown in FIG. 2, the voltage monitor circuit 101 comprises an overcharge monitor circuit 101a and an over-discharge monitor circuit 101b. The overcharge monitor circuit 101a monitors whether the battery cells E1, E2, and E3 are in an overcharged state, and switches off the FET 103 when the battery cells are in an overcharged state. The over-discharge monitor circuit 101b monitors whether the battery cells E1, E2, and E3 are in an over-discharged state, and switches off the FET 104 when the battery cells E1, E2, and E3 are in an over-discharged state.

The overcharge monitor circuit 101a comprises comparators 121, 122, and 123, reference power sources e1a, e1b, and e1c, and an OR gate 124.

The comparator 121 compares the voltage of the battery cell E1 with a reference voltage Vref1 generated by the reference power source e1a. If the voltage of the battery cell E1 is higher than the reference voltage Vref1, the comparator 121 outputs "1". If the voltage of the battery cell E1 is lower than the reference voltage Vref1, the comparator 121 outputs "0". Here, "1" indicates that the output of a comparator is at the high logic level, and "0" indicates that the output of a comparator is at the low logic level. The comparator 122 compares the voltage of the battery cell E2 with a reference voltage Vref1 generated by the reference power source e1b. If the voltage of the battery cell E2 is higher than the reference voltage Vref1, the comparator 122 outputs "1". If the voltage of the battery cell E2 is lower than the reference voltage Vref1, the comparator 122 outputs "0". The comparator 123 compares the voltage of the battery cell E3 with a reference voltage Vref1 generated by the reference power source e1c. If the voltage of the battery cell E3 is higher than the reference voltage Vref1, the comparator 123 outputs "1". If the voltage of the battery cell E3 is lower than the reference voltage Vref1, the comparator outputs "0".

The outputs of the comparators 121, 122, and 123 are supplied to the OR gate 124. The OR gate 124 performs an OR operation on the outputs of the comparators 121, 122, and 123, and supplies a result of the OR operation to the gate of the FET 103. If any of the outputs of the comparators 121, 122, and 123 is "1", i.e., if any of the battery cells E1, E2, and E3 is in an overcharged state and the signal supplied from the OR gate 124 to the gate of the FET 103 is "1", the FET 103 is switched off so as to prevent overcharge.

The over-discharge monitor circuit 101b comprises comparators 111, 112, and 113, reference power sources e2a, e2b, and e2c, and an OR gate 114.

The comparator 111 compares the voltage of the battery cell E1 with a reference voltage Vref2 generated by the reference power source e2a. If the voltage of the battery cell E1 is higher than the reference voltage Vref2, the comparator 111 outputs "0". If the voltage of the battery cell E1 is lower than the reference voltage Vref2, the comparator 111 outputs "1". The comparator 112 compares the voltage of the battery cell E2 with a reference voltage Vref2 generated by the reference power source e2b. If the voltage of the battery cell E2 is higher than the reference voltage Vref2, the comparator 112 outputs "0". If the voltage of the battery cell E2 is lower than the reference voltage Vref2, the comparator 112 outputs "1". The comparator 113 compares the voltage of the battery cell E3 with a reference voltage Vref2 generated by the reference power source e2c. If the voltage of the battery cell E3 is higher than the reference voltage Vref2, the comparator 113 outputs "0". If the voltage of the battery cell E3 is lower than the reference voltage Vref2, the comparator 113 outputs "1".

The outputs of the comparators 111, 112, and 113 are supplied to the OR gate 114. The OR gate 114 performs an OR operation on the outputs of the comparators 111, 112, and 113, and supplies a result of the OR operation to the gate of the FET 104. If any of the outputs of the comparators 111, 112, and 113 is "1", i.e., if any of the battery cells E1, E2, and E3 is in an over-discharged state and the signal supplied from the OR gate 114 to the gate of the FET 104 is "1", the FET 104 is switched off so as to prevent over-discharge.

When a current larger than a certain current value flows, the fuse 102 fuses and cuts off the current. By doing so, the fuse 102 serves as a part of a double protection circuit in a case where the voltage monitor circuit 100 does not properly cut off the large current or the FETs 103 and 104 do not properly function to cut off the large current due to some trouble such as short-circuiting.

The power supply terminals 105 and 106 are connected to an electronic device 130, as shown in FIG. 1. The electronic device 130 comprises a power source circuit 131 and a device main body 132. The power source circuit 131 converts a d.c. voltage supplied from the battery unit 100 to a d.c. voltage to be used in the device main body 132.

At the time of shipping, the battery unit 100 is connected to the electronic device 130. The battery unit 100 may be fixed to the electronic device 130 with screws. If the battery unit 100 and the electronic device 130 are packed separately in such a case, the package becomes large, and a large amount of cushioning material is required. Moreover, after unpacking, the user has to take the trouble to screw the battery unit 100 to the electronic device 130.

In a case of an electronic device having built-in dry batteries, an insulating sheet is inserted between the dry batteries and the electrodes of the electronic device. The user normally removes the insulating sheet when he/she starts using the electronic device. By removing the insulating sheet, the dry batteries and the electronic device are connected, and electric power is supplied from the dry batteries to the electronic device. Compared with the dry batteries, however, the battery unit 100 has more connection pins for connection with the electronic device 130. Also, the connection connector of the battery unit 100 has a more complicated structure. For these reasons, an insulating sheet cannot be inserted between the battery unit 100 and the electronic device 130, and, at the time of shipping, the battery unit 100 is already mounted on the electronic device 130, as shown in FIG. 1.

The battery unit 100 shown in FIG. 1 remains connected to the power source circuit 131 even when the power switch of the electronic device 130 is turned off. The power source circuit 131 is formed by a DC-DC converter, and consumes electric current even when the output is cut off. The voltage monitor circuit 101 of the battery unit 100 also constantly consumes a small amount of electric current. Because of this, after the shipping of the electronic device 130, the battery cells E1, E2, and E3 of the battery unit 100 are consumed. If the battery unit 100 is in an over-discharged state due to the consumption of the battery cells E1, E2, and E3, the FET 104 is switched off, and the battery cells E1, E2, and E3 are disconnected from the electronic device 130. If the electronic device 130 is left unpacked for an even longer period of time, the battery cells E1, E2, and E3 might over-discharge due to current consumed by the voltage monitor circuit 101.

SUMMARY OF THE INVENTION

A general object of the present invention is to provide a protection method, a control circuit, and a battery unit, in which the above disadvantages are eliminated.

A more specific object of the present invention is to provide a protection method in which built-in battery cells never over-discharge even if connected to an electronic device for a long period of time, thereby preventing the battery unit from deteriorating and shortening the life thereof.

The above objects of the present inventions are achieved by a protection method of protecting battery cells from over-discharging. This method comprises the steps of: monitoring the voltage of each of the battery cells; controlling a discharge control switch connected between a load and the battery cells in accordance with the voltage of each of the battery cells; and maintaining the discharge control switch in a forced OFF state in accordance with a forced off signal supplied from outside. In this method, the discharge control switch is released from the forced OFF state in accordance with a release signal supplied from outside. The discharge control switch is also released from the forced OFF state when the battery cells are being charged. The discharge control switch is also released from the forced OFF state when any of the battery cells is in an overcharged state. The discharge control switch is also released from the forced OFF state when the voltage of any of the battery cells reaches a predetermined voltage value.

With the above constitution, by maintaining the switch in the forced OFF state in accordance with the forced OFF signal supplied from outside, the battery cells can be prevented from over-discharging even when the battery cells go uncharged over a long period of time. Thus, the battery cells can be prevented from deterioration.

In the case where the discharge control switch is released from the forced OFF state in accordance with a release signal supplied from outside, a normal charge and discharge control operation can be performed.

In the case where the discharge control switch is released from the forced OFF state when the battery cells are charged, the forced OFF state can be automatically cancelled when the user starts using the electronic device.

In the case where the discharge control switch is released from the forced OFF state when the battery cells are in an overcharged state, the discharge control switch does not restrict discharging in an overcharged state, thereby protecting the battery cells.

In the case where the discharge control switch is also released from the forced OFF state when the voltage of any of the battery cells reaches a predetermined voltage value, the forced OFF state can be automatically cancelled before the battery cells are overcharged.

The above and other objects and features of the present invention will become more apparent from the following description taken in conjunction with the accompanying drawings.

DESCRIPTION OF THE PREFERRED EMBODIMENTS

The following is a description of embodiments of the present invention, with reference to the accompanying drawings.

Figure 1:
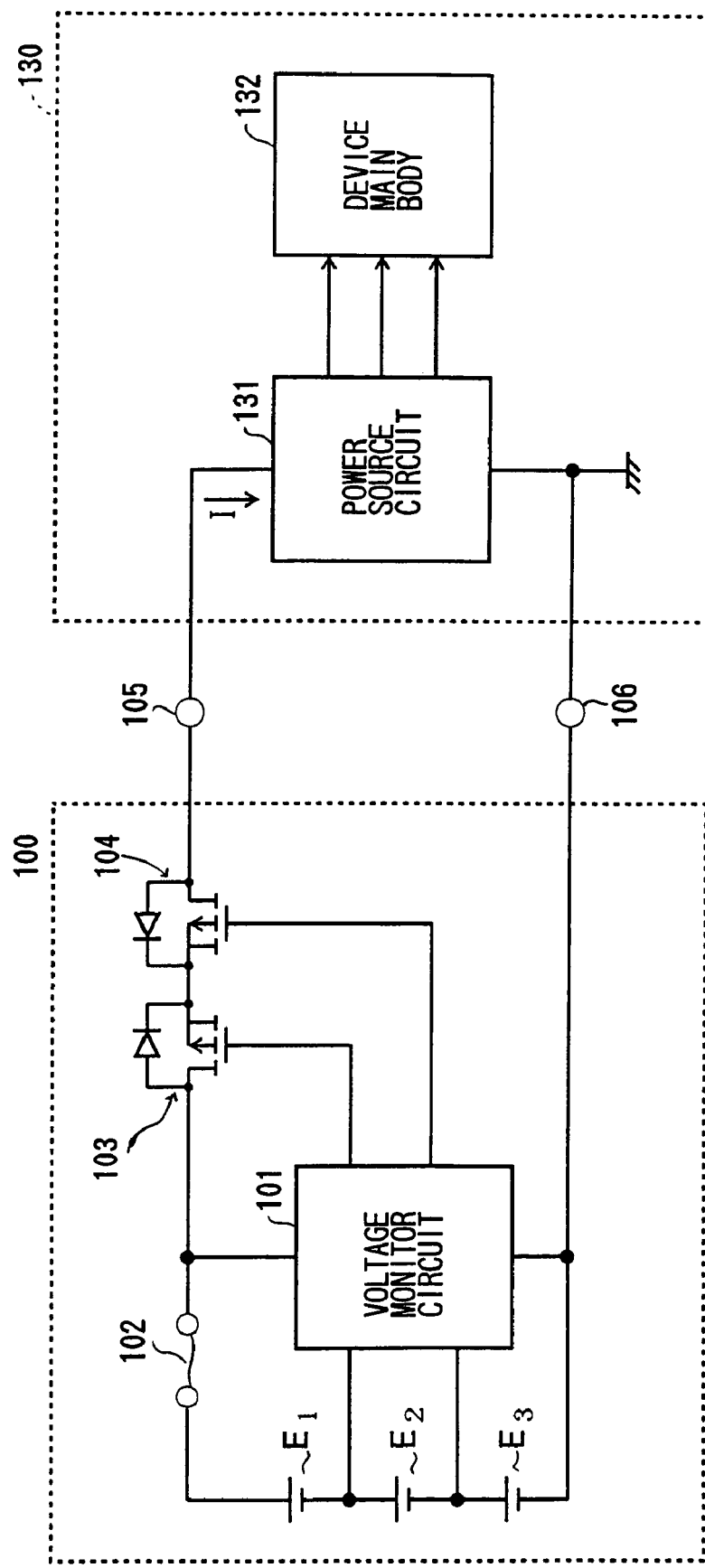
FIG. 1 is a block diagram of an example battery unit of the prior art.
Figure 3:
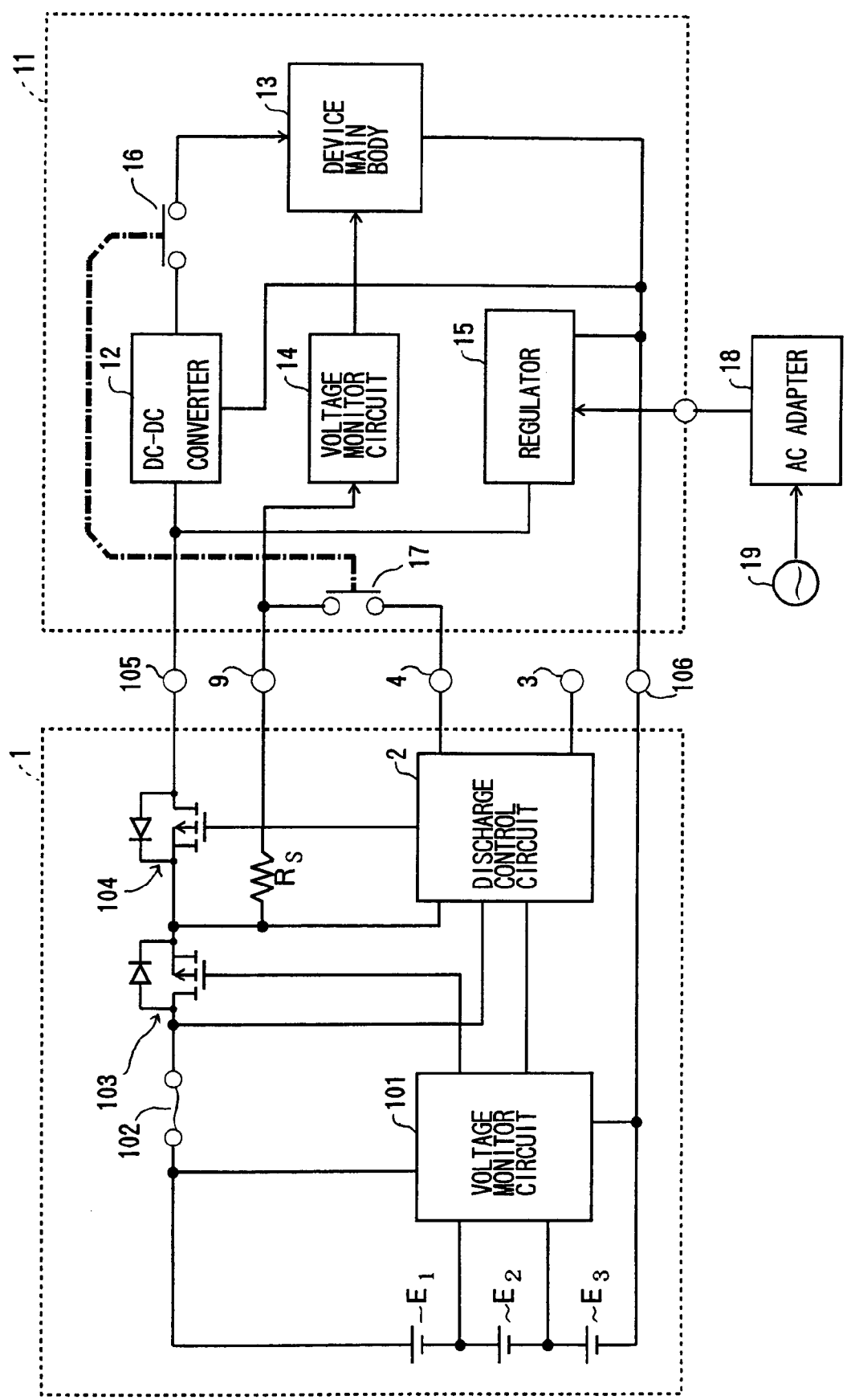
FIG. 3 is a block diagram of a first embodiment of the present invention.

FIG. 3 is a block diagram of a first embodiment of the present invention. In this figure, the same components as in FIG. 1 are indicated by the same reference numerals.

A battery unit 1 of this embodiment has a discharge control circuit 2 between a voltage monitor circuit 101 and a discharge control FET 104.

The discharge control circuit 2 is connected to a set terminal 3, a reset terminal 4, and an over-discharge control circuit 101b (shown in FIG. 2) of the voltage monitor circuit 101. The discharge control circuit 2 holds a discharge control signal at "1" when the set terminal 3 is set at "1", so as to turn off the discharge control FET 104 regardless of a discharge control signal outputted from the over-discharge control circuit 101b. When the reset terminal 4 is set at "1", the discharge control signal outputted from the over-discharge control signal is supplied to the discharge control FET 104.

A FET 103 shown in FIGS. 3 to 10 is a charge control FET which functions as a charge control switch. The discharge control FET 104 shown in FIGS. 3 to 10 functions as a discharge control switch. These FETs are p-channel FETs, which are ON when the potential at the gate side is at the low level.

Figure 4:
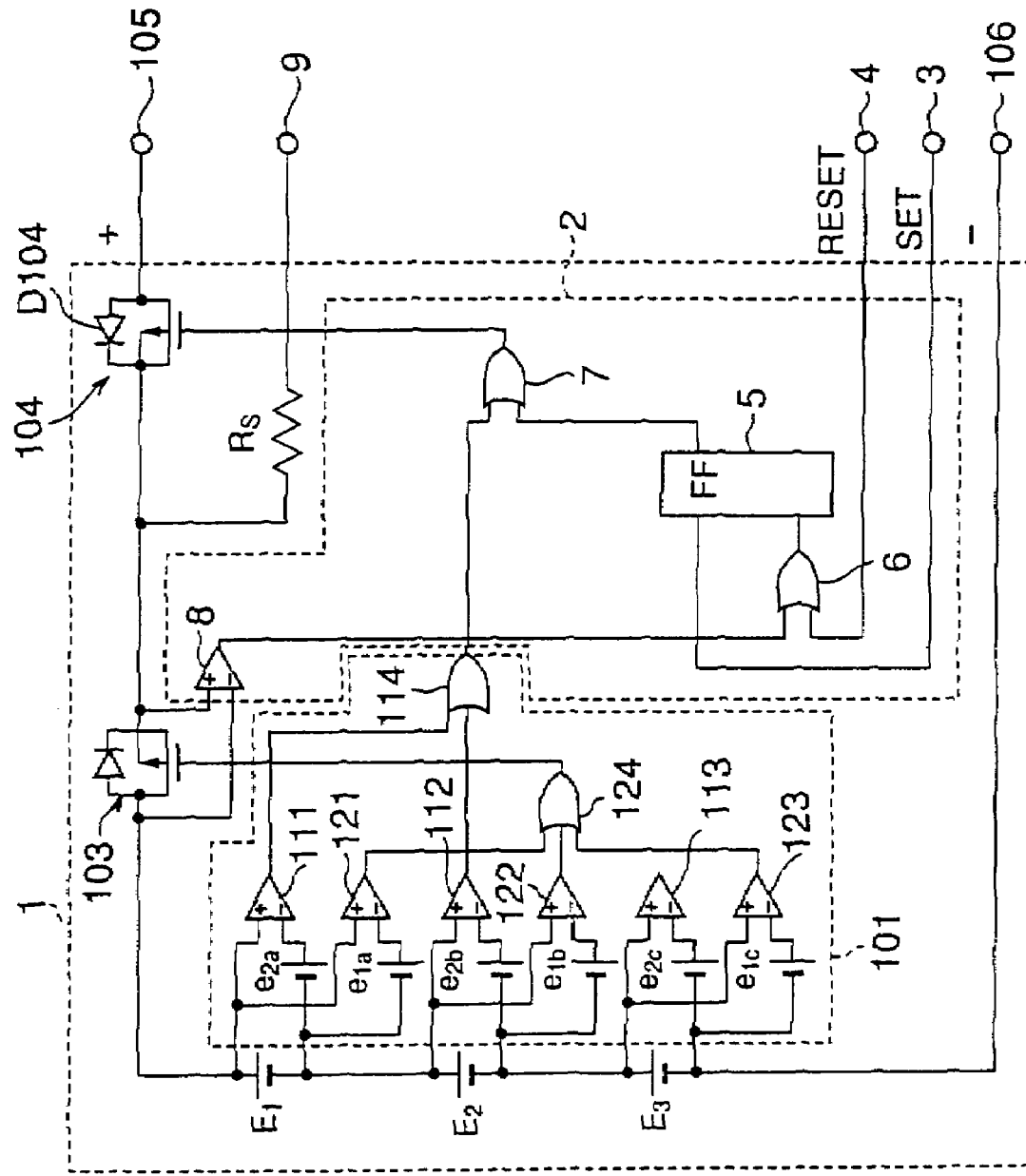
FIG. 4 is a block diagram of a voltage monitor circuit of the first embodiment of the present invention.
Figure 5:
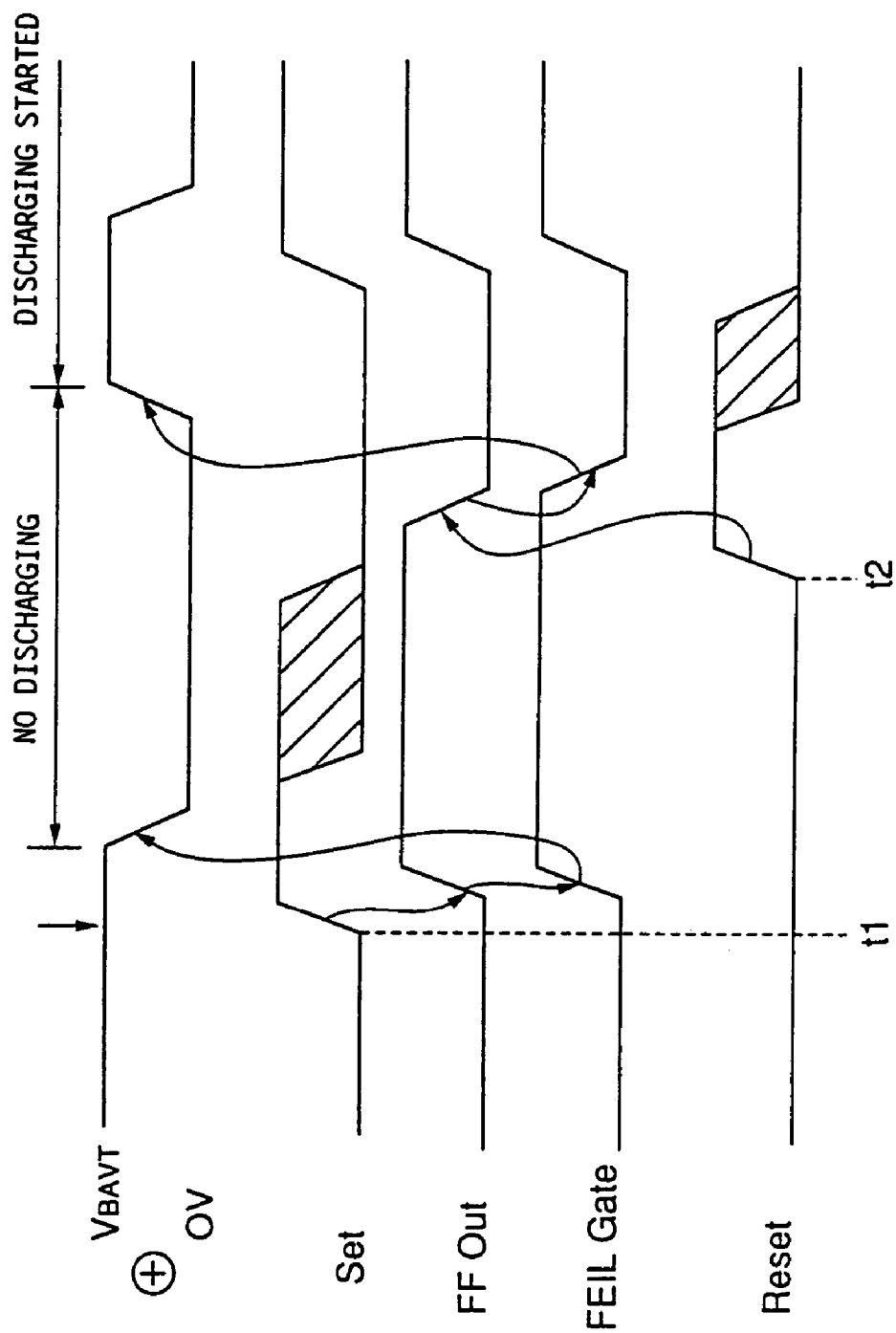
FIGS. 5A to 5E illustrates an operation of a discharge control circuit of the first embodiment of the present invention.

FIG. 4 is a circuit diagram of the discharge control circuit of the first embodiment of the present invention.

The discharge control circuit 2 comprises a flip-flop (FF) 5, OR gates 6 and 7, and a comparator 8.

The flip-flop 5 has a set terminal and a reset terminal. The output of the flip-flop 5 is set at "1" when its set terminal is set at "1". The output of the flip-flop 5 is reset at "0" when its reset terminal is set at "1". The set terminal 3 is connected to the set terminal of the flip-flop 5, and the output of the OR gate 6 is supplied to the reset terminal of the flip-flop 5.

The OR gate 6 is supplied with a reset signal applied to the reset terminal 4 and the output of the comparator 8 so as to perform an OR operation on the reset signal and the output of the comparator 8. The comparator 8 detects a voltage between the source and the drain of the charge control FET 103. If the voltage between the source and the drain is higher than a threshold value, the comparator 8 outputs a high-level signal. If the voltage between the source and the drain is lower than the threshold value, the comparator 8 outputs a low-level signal. In this manner, the comparator 8 judges whether the charging voltage is higher than a predetermined level or not from the voltage between the source and the drain of the charge control FET 103, thereby resetting the flip-flop 5. When the flip-flop 5 is set and the discharge control FET 104 is OFF before charging, the comparator 8 also detects electrification from the voltage between the source and the drain of the charge control FET 103. If electrification is detected, the flip-flop 5 is reset, the output of the flip-flop 5 becomes "low", and the discharge control FET 104 is turned on.

When the set terminal 3 becomes "1", the flip-flop 5 outputs "1". When the output of the reset terminal 4 or the output of the comparator 8 becomes "1", the flip-flop 5 outputs "0". The output of the flip-flop 5 is supplied to the OR gate 7.

The OR gate 7 is supplied with the output of the over-discharge control circuit 101b as well as the output of the flip-flop 5. The OR gate 7 performs an OR operation on the output of the flip-flop 5 and the output of the over-discharge control circuit 101b.

The output of the OR gate 7 is supplied to the discharge control FET 104. The discharge control FET 104 is OFF when the output of the OR gate 7 is "1", and is ON when the output of the OR gate is "0". In other words, when the flip-flop 5 is set, the discharge control FET 104 becomes "1" and is turned off. When the flip-flop 5 is reset and outputs "0", the discharge control FET 104 is turned on or off depending on the output of the over-discharge control circuit 101b of the voltage monitor circuit 101.

FIGS. 5A to 5E illustrate an operation of a charge control circuit of the first embodiment of the present invention. FIG. 5A shows the voltage between a terminal 105 and a terminal 106. FIG. 5B shows a set signal inputted into the set terminal 3. FIG. 5C shows the output of the flip-flop 5. FIG. 5D shows the gate voltage of the discharge control FET 104. FIG. 5E shows a waveform chart of a reset signal inputted into the reset terminal 4.

At timing t1, a set signal "1" is supplied to the set terminal 3 as shown in FIG. 5B. The output of the flip-flop 5 is then set at "1" as shown in FIG. 5C, and the gate of the discharge control FET 104 becomes "1" as shown in FIG. 5D. While the gate is "1", the discharge control FET 104 is turned off, and the output voltage of the terminal 105 becomes 0 V as shown in FIG. 5A. Since the gate of the discharge control FET 104 is fixed at "1" regardless of the charge control signal supplied from the voltage monitor circuit 101, the discharge control FET 104 is turned off regardless of the state of each of battery cells E1, E2, and E3.

At a timing t2, a reset signal "1" is supplied to the reset terminal 4 as shown in FIG. 5E. The output of the flip-flop 5 is then reset at "0" as shown in FIG. 5C. When the output of the flip-flop 5 is "0", the OR gate 7 directly outputs the output of the charge control circuit 101b of the voltage monitor circuit 101.

Accordingly, the discharge control FET 104 is switched depending on the output of the charge control circuit 101b of the voltage monitor circuit 101. When the battery cells E1, E2, and E3 are in an over-discharging state, the discharge control FET 104 is turned off.

The battery unit 1 is mounted on an electronic device 11, and supplies power to the electronic device 11. The electronic device comprises a DC-DC converter 12, a device main body 13, a voltage monitor circuit 14, a regulator 15, a main switch 16, and a reset switch 17.

The DC-DC converter 12 is connected to the power source terminal 105 of the battery unit 1, and converts the voltage supplied from the battery unit 1 to a desired voltage. The DC-DC converter 12 is also connected to the regulator 15, and converts the voltage supplied from the regulator 15 to a desired voltage.

The voltage converted by the DC-DC converter 12 is then supplied to the device main body 13 via the main switch 16. The main switch 16 is turned on to supply the voltage converted by the DC-DC converter 12 to the device main body 13. The main switch 16 is interlocked with the reset switch 17. When the main switch 16 is turned on, the reset switch 17 is also turned on.

When the reset switch 17 is turned on, a monitoring voltage is applied to the reset terminal 4 of the battery unit 1. Thus, the reset terminal 4 becomes "1". When the reset terminal 4 becomes "1" the discharge control FET 104 is released from the OFF state, and the discharge control FET 104 is switched on and off depending on the monitoring result of the voltage monitor circuit 101. Before the electronic device 11 is shipped, the battery unit 1 has the battery cells E1, E2, and E3 all charged to a certain extent. A voltage is then applied to the set terminal 3, so that the set terminal 3 becomes "1". Thus, the output of the flip-flop 5 is fixed at "1", and the discharge control FET 104 is fixed in the OFF state. The battery unit 1 is then mounted on the electronic device 11.

With the electronic device 11, an instruction is provided to connect an AC adapter 18 and switch on the main switch 16 after undoing the package of the electronic device 11. After the main switch 16 is switched on, the reset switch 17 is switched on, and the reset terminal 4 becomes "1" due to the monitoring voltage outputted from a terminal 9. The discharge control FET 104 is thus switched on.

After being released from the OFF state, the discharge control FET 104 is switched on and off depending on the monitoring result of the voltage monitor circuit 101, i.e., the charging voltages of the respective battery cells E1, E2, and E3.

In this embodiment, the discharge control FET 104 is fixed in the OFF state at the time of shipping, so that the connection of the battery cells E1, E2, and E3 with the DC-DC converter 12 that consumes a large amount of power during a non-operation period can be certainly severed. Thus, the amount of discharge of the battery unit 1 during the period between the shipping and the start of use can be restricted to a minimum amount. In this manner, even if the electronic device 11 is not used for a long period of time after the shipping, the battery cells E1, E2, and E3 of the battery unit 1 do not over-discharge, and can be prevented from deteriorating.

The voltage monitor circuit 101 and the discharge control circuit 2 shown in FIGS. 3 and 4 can be respectively formed by one IC. In a case where the voltage monitor circuit 101 is formed by one IC, terminals for connections between the voltage monitor circuit 101 and the respective battery cells E1, E2, and E3, and a terminal for a signal line with the discharge control circuit 2 are employed. If the discharge control circuit 2 is formed by one IC, terminals for connecting the discharge control circuit 2 and the FETs 103 and 104 are employed. Also, each IC is provided with terminals for the battery cells, the FETs, a reset signal and a set signal shown in FIGS. 3 and 4. Although these terminals are not shown in the drawings, they should be apparent to those skilled in the art, and should be construed as being included in the disclosure of the present invention.

The voltage monitor circuit 101 and the discharge control circuit 2 may also be formed by one IC. In such a case, the one IC is provided with terminals for connections with the respective battery cells E1, E2, and E3, for connections with the FETs 103 and 104, and for signals such as a reset signal and a set signal. Although these terminals are not shown in the drawings, they should be apparent to those skilled in the art, and should be construed as being included in the disclosure of the present invention.

The voltage monitor circuit 101 and the discharge control circuit 2 including the FETs 103 and 104 may also be formed by one IC. In such a case, the one IC is also provided with terminals for connections with the respective battery cells E1, E2, and E3, and for signals such as a reset signal and a set signal. Although these terminals are not shown in the drawing, they should be apparent to those skilled in the art, and should be construed as being included in the disclosure of the present invention.

Although the discharge control FET 104 of the battery unit 1 is released from the OFF state by switching on the main switch 16 of the electronic device 11 in the above embodiment, it is possible to release the discharge control FET 104 from the OFF state by connecting the AC adapter 18 to the electronic device 11.

Figure 6:
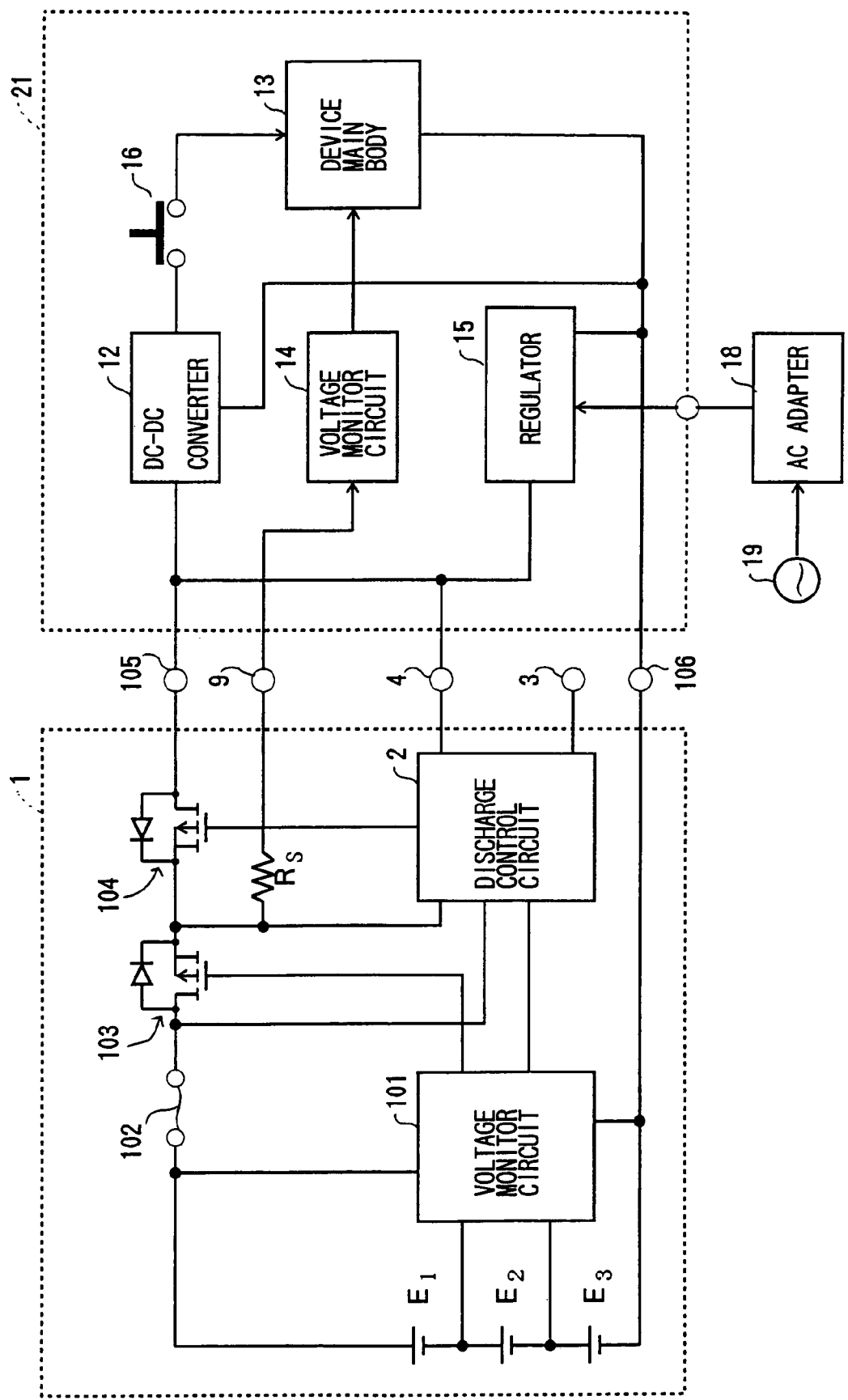
FIG. 6 is a block diagram of a first modification of the first embodiment of the present invention.

FIG. 6 is a block diagram of a first modification of the first embodiment of the present invention. In this figure, the same components as in FIG. 3 are indicated by the same reference numerals.

This modification differs from the first embodiment of FIG. 3 in the electronic device. An electronic device 21 of this modification is not provided with the reset switch 17 of FIG. 3, and the output of the regulator 15 is connected not only to the DC-DC converter 12 but also to the reset terminal 4 of the battery unit 1.

In this modification, when the AC adapter 18 is connected to the electronic device 21, the output of the regulator 15 is connected not only to the DC-DC converter 12 but also to the reset terminal 4 of the battery unit 1. In other words, when the AC adapter 18 is connected to the electronic device 21, the reset terminal 4 of the battery unit 1 becomes "1".

When the reset terminal 4 becomes "1", the discharge control FET 104 is released from the OFF state, and is switched on and off depending on monitoring results from the voltage monitor circuit 101.

Although the discharge control FET 104 is released from the OFF state by setting the reset terminal 4 at "1" in this modification, the discharge control FET 104 may be released from the OFF state by the voltage between the source and the drain of the charge control FET 103.

Figure 7:
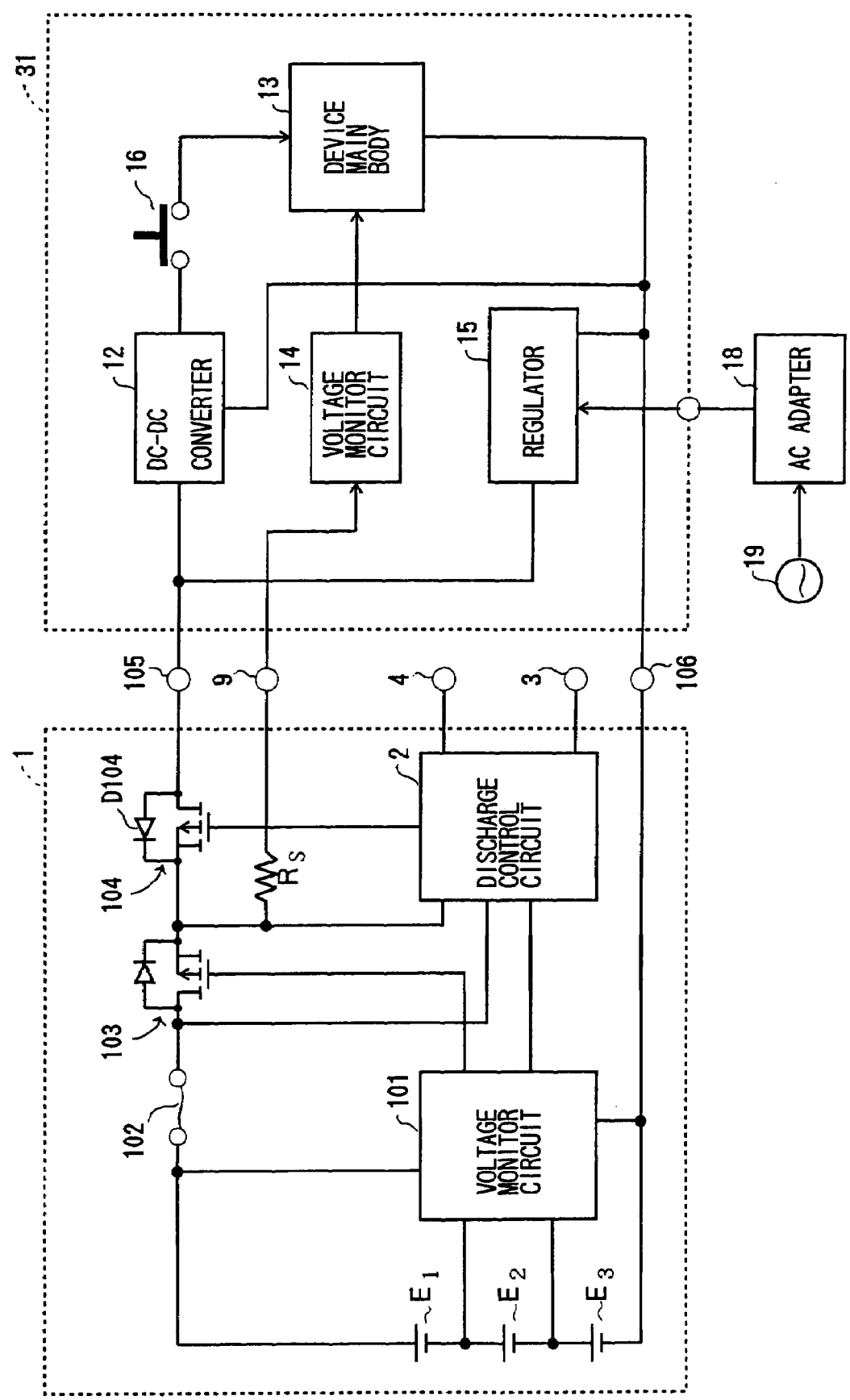
FIG. 7 is a block diagram of a second modification of the first embodiment of the present invention.

FIG. 7 is a block diagram of a second modification of the first embodiment of the present invention. In this figure, the same components as in FIG. 3 are indicated by the same reference numerals.

This modification differs from the first embodiment shown in FIG. 3 in the electronic device. An electronic device 31 of this modification is structurally the same as a general electronic device which is driven by the AC adapter 18 or a battery. In other words, the electronic device 31 is not provided with the terminal connected to the reset terminal 4 of the battery unit 1.

In this modification, the AC adapter 18 is connected to the electronic device 31, so that the output DC voltage of the AC adapter 18 is supplied to the regulator 15. The regulator 15 converts the output DC voltage of the AC adapter 18 to a desired voltage, and supplies the converted voltage to the DC-DC converter 12. Here, the output voltage of the regulator 15 is supplied as a charging voltage to the terminal 105 of the battery unit 1.

The discharge control FET 104 is connected between the source and the drain of the charge control FET 103 in such a manner that the anode of a diode D104 faces the terminal 105 while the cathode of the diode D104 faces the charge control FET 103. Accordingly, when a charging voltage is supplied from the regulator 15 to the terminal 105, the voltage between the charge control FET 103 and the discharge control FET 104 becomes higher, and a voltage is applied in the direction opposite to the discharging direction.

The discharge control circuit 2 monitors the voltage between the source and the drain of the charge control FET 103 using the comparator 8 shown in FIG. 4. The comparator 8 outputs "1" when the voltage between the source and the drain of the charge control FET 103 is opposite to the discharging direction, i.e., when the voltage is high on the side of the terminal 105 and low on the side of the battery cells E1, E2, and E3. Since the output of the comparator 8 is connected to the reset terminal of the flip-flop 5, the flip-flop 5 is reset when the output of the comparator 8 becomes "1". Thus, the discharge control FET 104 is released from the OFF state.

As described above, the battery unit 1 of this modification can be applied to the conventional electronic device 31 having no circuit for setting the reset terminal 4 at "1". Even if the electronic device 31 is not used for a long period of time after the shipping, the battery cells E1, E2, and E3 of the battery unit 1 do not over-charge. Thus, the battery cells E1, E2, and E3 can be prevented from deteriorating.

In the first and second modifications, the voltage monitor circuit 101 and the discharge control circuit 2 shown in FIGS. 6 and 7 may be respectively formed by one IC, as in the case of the first embodiment shown in FIGS. 3 and 4. In a case where the voltage monitor circuit 101 is formed by one IC, terminals for connections between the voltage monitor circuit 101 and the respective battery cells E1, E2, and E3, and a terminal for a signal line with the discharge control circuit 2 are employed. In a case where the discharge control circuit 2 is formed by one IC, terminals for connections between the discharge control circuit 2 and the FETs 103 and 104 are employed. Also, each IC may be provided with terminals for connections with the battery cells and the FETs, and terminals for reset and set signals. Although these terminals are not shown in the drawings, they should be apparent to those skilled in the art, and should be construed as being included in the disclosure of the present invention.

The voltage monitor circuit 101 and the discharge control circuit 2 shown in FIGS. 6 and 7 may also be formed by one IC. In such a case, the one IC is provided with terminals for connections with the respective battery cells E1, E2, and E3, and terminals for connections with the FETs 103 and 104. Also, the IC may be provided with terminals for connections with the battery cells and the FETs, and for reset and set signals. Although these terminals are not shown in the drawings, they should be apparent to those skilled in the art, and should be construed as being included in the disclosure of the present invention.

The voltage monitor circuit 101 and the discharge control circuit 2 including the FETs 103 and 104 may also be formed by one IC. In such a case, the one IC is provided with terminals for connections with the respective battery cells. The one IC may also be provided with terminals for the battery cells and reset and set signals. Although these terminals are not shown in the drawings, they should be apparent to those skilled in the art, and should be construed as being included in the disclosure of the present invention.

Although the discharge control circuit 2 of this embodiment resets the flip-flop 5 depending on the voltage of the reset terminal 4 or the voltage between the source and the drain of the charge control FET 103, it is also possible to set or reset the flip-flop 5 depending on a signal for controlling the charge control FET 103.

Figure 8:
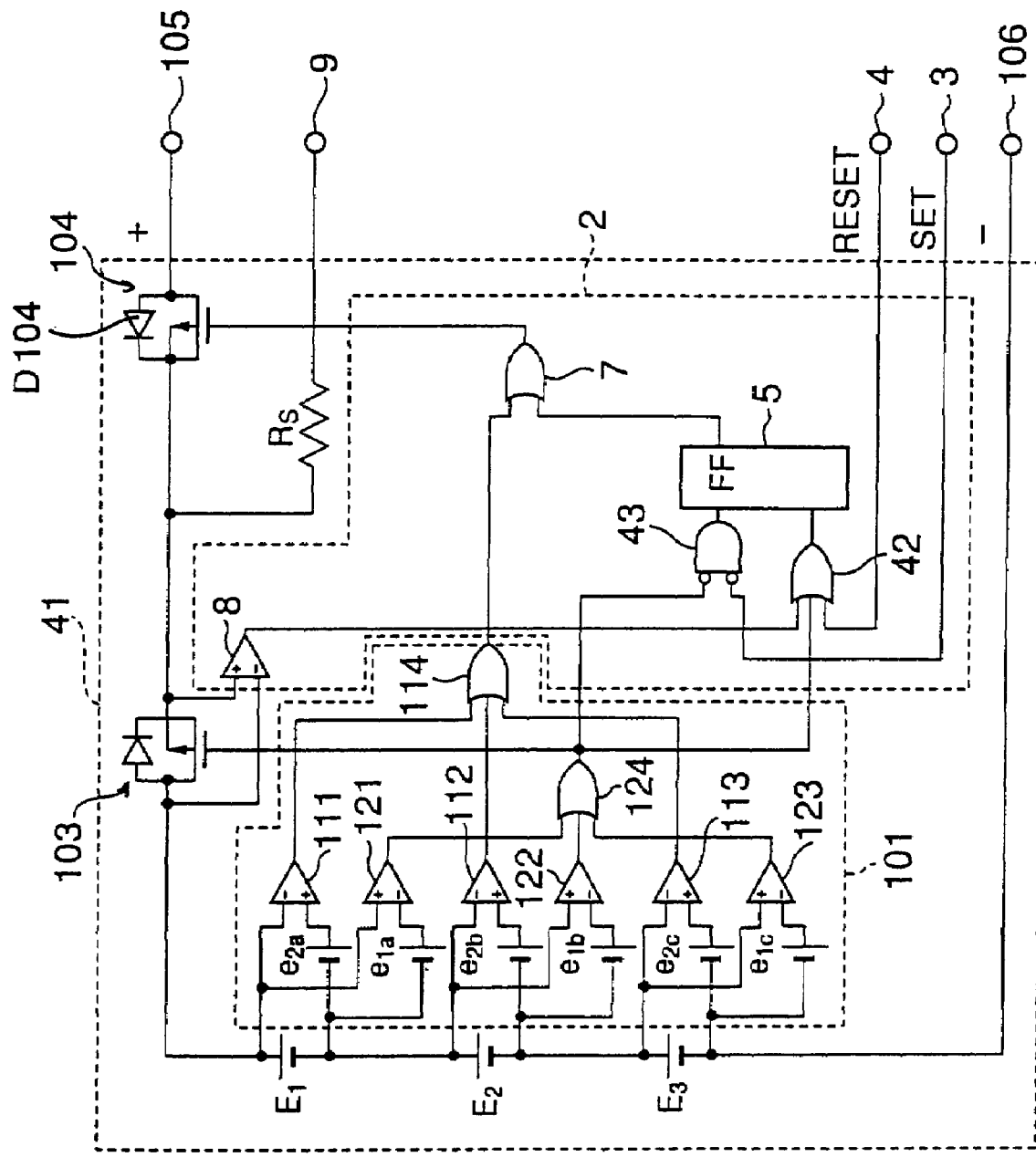
FIG. 8 is a block diagram of a battery unit of a second embodiment of the present invention.

FIG. 8 is a block diagram of a battery unit of a second embodiment of the present invention. In this figure, the same components as in FIG. 4 are indicated by the same reference numerals.

A battery unit 41 of this embodiment is formed by adding an OR gate 42 and a NOR gate 43 to the battery unit 1 shown in FIG. 4. The OR gate 42 performs an OR operation on the output of the reset terminal 4, the output of the comparator 8, and a charge control signal for controlling the charge control FET 103. The NOR gate 43 performs a NOR operation on the input of the set terminal 3 and the charge control signal for the charge control FET 103.

In this embodiment, the voltage monitor circuit 101 detects overcharge in the battery cells E1, E2, and E3. When the charge control signal supplied to the gate of the charge control FET 103 is "1", the OR gate 42 outputs "1". The flip-flop 5 is then reset, so that the discharge control FET 104 is released from the OFF state. Accordingly, when there is overcharge in the battery cells E1, E2, and E3, the discharge control FET 104 is switched on by the flip-flop 5, so as not to prevent the battery cells E1, E2, and E3 from discharging.

When the charge control signal for controlling the charge control FET 103 and the set signal from the set terminal 3 are both "0", the NOR gate 43 outputs "1". In an overcharge state, the output of the flip-flop 5 is not set at "1" by the NOR gate 43. Accordingly, the charge control FET 104 is on, and does not prevent the battery cells E1, E2, and E3 from discharging.

In this embodiment, the charge control FET is never fixed in the OFF state when the battery cells E1, E2, and E3 are overcharged.

As in the first embodiment, the voltage monitor circuit 101 and the discharge control circuit 2 shown in FIG. 8 may each be formed by one IC. In a case where the voltage monitor circuit 101 is formed by one IC, terminals for connections between the voltage monitor circuit and the respective battery cells E1, E2, and E3, and terminals for a signal line of the discharge control circuit 2 are employed. In a case where the discharge control circuit 2 is formed by one IC, terminals for connections between the discharge control circuit 2 and the FETs 103 and 104 are employed. Each IC is also provided with terminals for connecting the IC to the battery cells and FETs, and terminals for reset and set signals. Although these terminals are not shown in the drawings, they should be apparent to those skilled in the art, and should be construed as being included in the disclosure of the present invention.

The voltage monitor circuit 101 and the discharge control circuit 2 shown in FIG. 8 may be formed by only one IC. In such a case, the IC is provided with terminals for connections between the IC and the respective battery cells E1, E2, and E3, and terminals for connections between the IC and the FETs 103 and 104. The IC is also provided with terminals for connecting the IC to the battery cells and FETs, and terminals for reset and set signals. Although these terminals are not shown in the accompanying drawings, they should be apparent to those skilled in the art, and should be construed as being included in the disclosure of the present invention.

The voltage monitor circuit 101 and the discharge control circuit 2 including the FETs 103 and 104 may also be formed by only one IC. In such a case, the IC is provided with terminals for connections between the IC and the respective battery cells E1, E2, and E3. The IC is also provided with terminals for battery cells and terminals for reset and set signals. Although these terminals are not shown in the accompanying drawings, they should be apparent to those skilled in the art, and should be construed as being included in the disclosure of the present invention.

Although an overcharge state of the battery cells E1, E2, and E3 is detected from the monitor result of the voltage monitor circuit 101 in this embodiment, the voltage of each of the battery cells E1, E2, and E3 may be detected so that the charge control FET 103 is fixed in an OFF state by a voltage smaller than the monitoring voltage.

Figure 9:
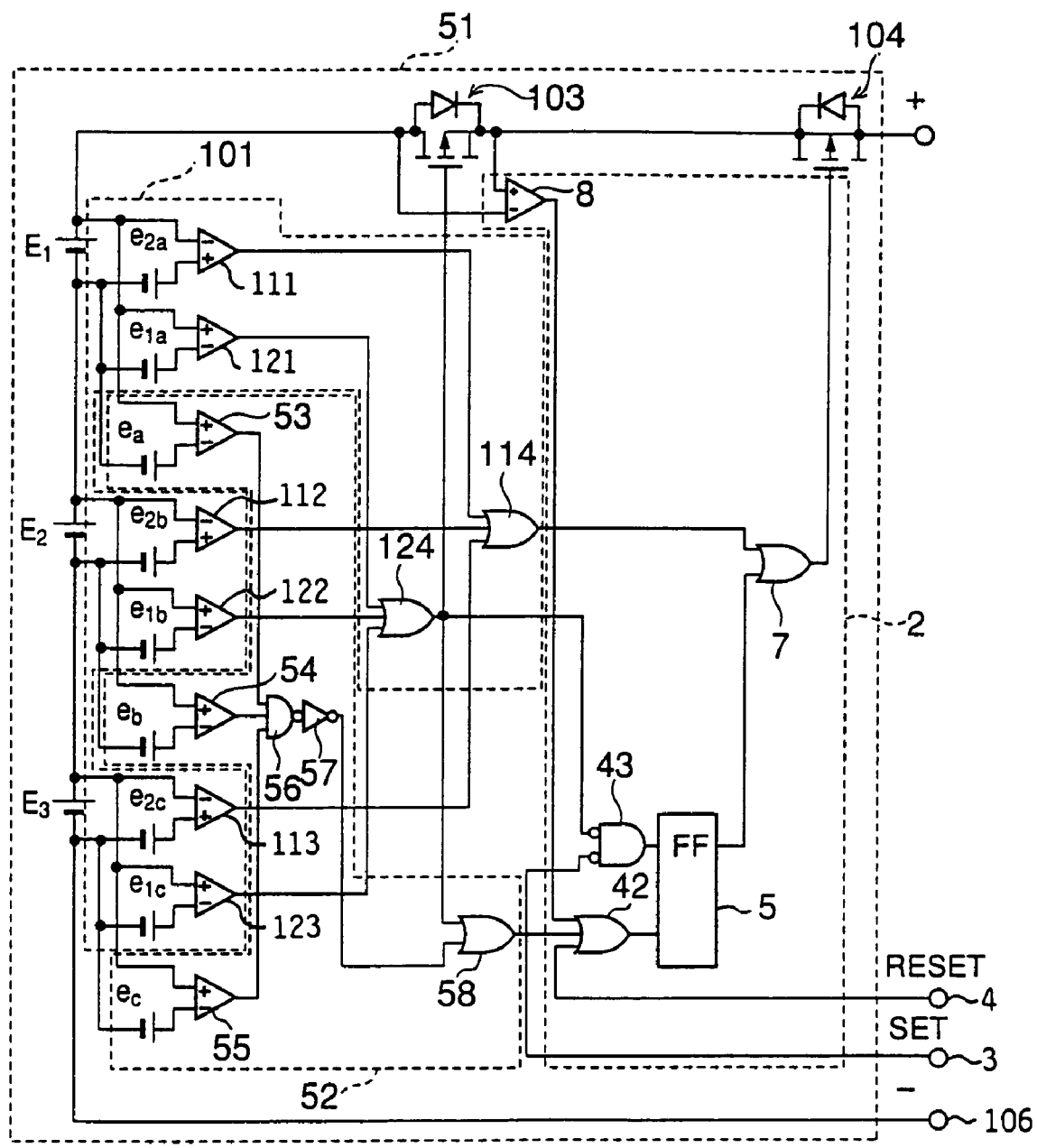
FIG. 9 is a block diagram of a battery unit of a third embodiment of the present invention.

FIG. 9 is a block diagram of a battery cell unit of a third embodiment of the present invention. In this figure, the same components as in FIG. 8 are indicated by the same reference numerals.

A battery unit 51 of this embodiment is formed by adding a voltage detector circuit 52 to the battery unit 4 shown in FIG. 8.

The voltage detector circuit 52 comprises reference voltage sources ea, eb, and ec, comparators 53, 54, and 55, a NAND gate 56, an inverter 57, and an OR gate 58.

The comparator 53 compares the battery cell E1 with the reference voltage source ea. If the voltage of the battery cell E1 is higher than the voltage of the reference voltage source ea, the comparator 53 outputs "1". If the voltage of the battery cell E1 is lower than the voltage of the reference voltage source eb, the comparator 53 outputs "0". The comparator 54 compares the battery cell E2 with the reference voltage eb. If the voltage of the battery cell E2 is higher than the voltage of the reference voltage source eb, the comparator 54 outputs "1". If the voltage of the battery cell E2 is lower than the voltage of the reference voltage source eb, the comparator 54 outputs "0". The comparator 54 compares the battery cell E3 with the reference voltage source ec. If the voltage of the battery cell E3 is higher than the voltage of the reference voltage source ec, the comparator 55 outputs "1". If the voltage of the battery cell E3 is lower than the voltage of the reference voltage source ec, the comparator 55 outputs "0". Here, the voltages generated by the reference voltage sources ea, eb, and ec are uniformly set at 0 V.

The outputs of the comparators 53 to 55 are supplied to the NAND gate 56. The NAND gate 56 performs a NAND operation on the outputs of the comparators 53 to 55. The output of the NAND gate 56 is supplied to the OR gate 58 via the inverter 57.

The NAND gate 56 and the inverter 57 constitute an AND gate. When all the outputs of the comparator 53 to 55 are "1", the AND gate outputs a high-level signal.

The output of the inverter 57 is supplied to the OR gate 58. A discharge control signal for controlling the charge control FET 103 is supplied to the OR gate 58. The OR gate performs an OR operation on the output of the inverter 57 and the discharge control signals for controlling the charge control FET 103. The output of the OR gate 58 is then supplied to the OR gate 42 of the discharge control circuit 2.

In the above manner, when the battery cells E1, E2, and E3 are overcharged, the flip-flop 5 is automatically reset, thereby canceling the OFF state of the discharge control FET 104.

As in the first and second embodiments, the voltage monitor circuit 101 and the discharge control circuit 2 shown in FIG. 9 may each be formed by one IC. In a case where the voltage monitor circuit 101 is formed by one IC, terminals for connections between the voltage monitor circuit 101 and the respective battery cells E1, E2, and E3, and a terminal for a signal line with the discharge control circuit 2 are employed. In a case where the discharge control circuit 2 is formed by one IC, terminals for connections between the discharge control circuit 2 and the FETs 103 and 104 are employed. Each IC is also provided with terminals for connecting the IC to the battery cells and the FETs, and terminals for reset and set signals. Although these terminals are not shown in the accompanying drawings, they should be apparent to those skilled in the art, and should be construed as being included in the disclosure of the present invention.

The voltage monitor circuit 101 and the discharge control circuit 2 shown in FIG. 9 may be formed by only one IC. In such a case, the IC is provided with terminals for connections between the IC and the respective battery cells E1, E2, and E3, and terminals for connections with the FETs 103 and 104. Also, the IC is provided with terminals for connecting the IC to the battery cells and the FETs, and terminals for reset and set signals. Although these terminals are not shown in the accompanying drawings, they should be apparent to those skilled in the art, and should be construed as being included in the disclosure of the present invention.

The voltage monitor circuit 101 and the discharge control circuit 2 including the voltage detector circuit 52 may be formed by only one IC. In such a case, the IC is provided with terminals for connections between the IC and the respective battery cells E1, E2, and E3, and terminals for connections with the FETs 103 and 104. Also, the IC is provided with terminals for connecting the IC to the battery cells and the FETs, and terminals for reset and set signals. Although these terminals are not shown in the accompanying drawings, they should be apparent to those skilled in the art, and should be construed as being included in the disclosure of the present invention.

The voltage monitor circuit 101, the discharge control circuit 2, and the voltage detector circuit 52, including the FETS 103 and 104, may be formed by only one IC. In such a case, the IC is provided with terminals for connections between the IC and the respective battery cells E1, E2, and E3. Also, the IC is provided with terminals for the battery cells, and reset and set signals. Although these terminals are not shown in the accompanying drawings, they should be apparent to those skilled in the art, and should be construed as being included in the disclosure of the present invention.

In the first to third embodiments, the flip-flop 5 is set at "1", so that the gate voltage of the discharge control FET 104 is set at "1". The discharge control FET 104 is thus fixed in the OFF state. However, the discharge control signal may be fixed at "1" by switching the reference voltage for detecting over-discharge in the battery cells E1, E2, and E3, thereby fixing the discharge control FET 104 in the OFF state.

Figure 2:
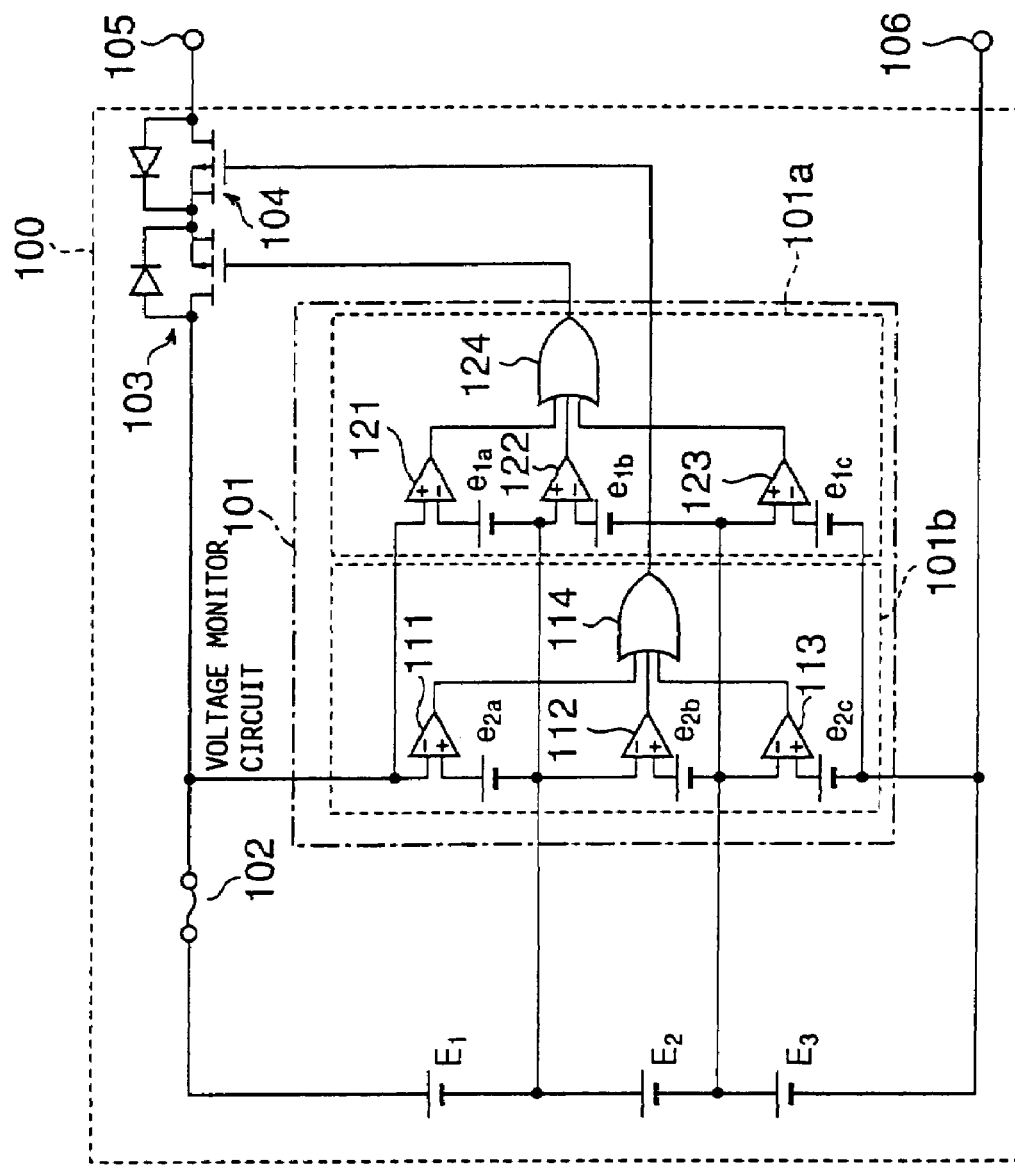
FIG. 2 is a block diagram of a voltage monitor circuit of an example battery unit of the prior art.
Figure 10:
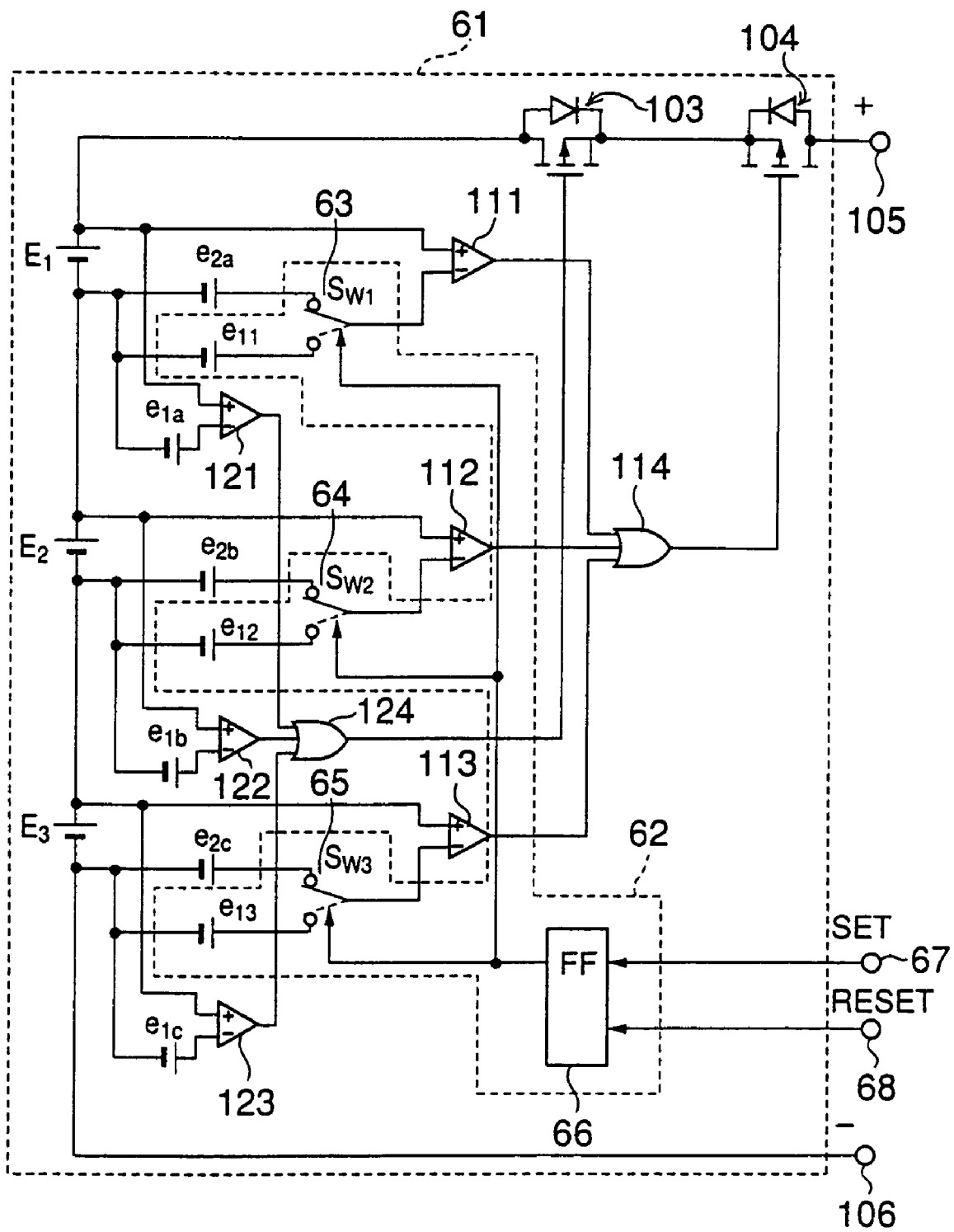
FIG. 10 is a block diagram of a battery unit of a fourth embodiment of the present invention.

FIG. 10 is a block diagram of a battery unit of a fourth embodiment of the present invention. In this figure, the same components as in FIG. 2 are indicated by the same reference numerals.

A battery unit 61 of this embodiment is provided with a discharge control circuit 62. The discharge control circuit 62 comprises reference voltage sources e11, e12, and e13, switches 63, 64, and 65, and a flip-flop 66.

The flip-flop 66 is connected to a set terminal 67 and a reset terminal 68. When the set terminal 67 becomes "1", the flip-flop 66 outputs "1". When the reset terminal 68 becomes "1", the flip-flop 66 outputs "0". The output of the flip-flop 66 is supplied as switch control signals for the switches 63, 64, and 65.

The switch 63 switches a reference voltage supplied to the comparator 11 to the reference voltage source e2a or e11 for detecting an over-discharge state, depending on the output of the flip-flop 66. The switch 64 switches the reference voltage supplied to the comparator 111 to the reference voltage source e2b or e12 for detecting an over-discharge state, depending on the output of the flip-flop 66. The switch 65 switches the reference voltage supplied to the comparator 111 to the reference voltage source e2c or e13 for detecting an over-discharge state, depending on the output of the flip-flop 66. Here, the reference voltage sources e11, e12, and e13 are sufficiently smaller than the reference voltage sources e2a, e2b, and e2c, so that the output of the comparator 111 becomes "1" when the reference voltage sources e11, e12, and e13 are selected.

The switches 63, 64, and 65 select the reference voltage e2a, e2b, and e2c when the output of the flip-flop 66 is "0". The switches 63, 64, and 65 select the reference voltage sources e11, e12, and e13 when the output of the flip-flop 66 is "1".

When the set terminal 67 and the output of the flip-flop 66 are both "1", the switches 63, 64, and 65 select the reference voltage sources e11, e12, and e13 Since the selected reference voltage sources e11, e12, and e13 are sufficiently smaller than the reference voltage sources e2a, e2b, and e2c, the outputs of the comparators 111, 112, and 113 become "1".

When the outputs of the comparators 111, 112, and 113 become "1", the OR gate 114 outputs "1". The output of the OR gate 114 is then supplied to the gate of the discharge control FET 104. Since the output of the OR gate 114 is "1", the discharge control FET 104 is switched off.

When the reset terminal 68 becomes "1" and the output of the flip-flop 66 becomes "0", the switches 63, 64, and 65 select the reference voltage sources e2a, e2b, and e2c. If the battery cells E1, E2, and E3 are in an over-discharge state here, the outputs of the comparators 111, 112, and 113 become "1" to switch off the discharge control FET 104. If the battery cells E1, E2, and E3 are not in an over-discharge state here, the outputs of the comparators 111, 112, and 113 become "0" to switch on the discharge control FET 104. A normal over-discharge control operation is thus started.

In this embodiment, the discharge control circuit 62 may be formed by one IC. In such a case, terminal for connections between the battery cells E1, E2, and E3, and terminals for connections with the reference voltage sources e2a, e2b, and e2c are employed. Also, the IC is provided with terminals for connections with the comparators 111, 112, and 113. Although these terminals are not shown in the accompanying drawings, they should be apparent to those skilled in the art, and should be construed as being included in the disclosure of the present invention.

One IC may include the comparators 111, 112, 113, 121, 122, and 123, the reference voltage sources e1a, e1b, e1c, e2a, e2b, and e2c, and the OR circuit 114, all shown in FIG. 10. In such a case, the IC is provided with terminals for connections with other components.

Such an IC may further contain the FETs 103 and 104. The IC is also provided with terminals for the battery cells, and terminals for reset and set signals. Although these terminals are not shown in the accompanying drawings, they should be apparent to those skilled in the art, and should be construed as being included in the disclosure of the present invention.

In the above embodiments, the battery cells in the battery unit are Li+ battery cells. However, the type of battery cells in the present invention is not limited to Li+ ion battery cells.

Figure 11:
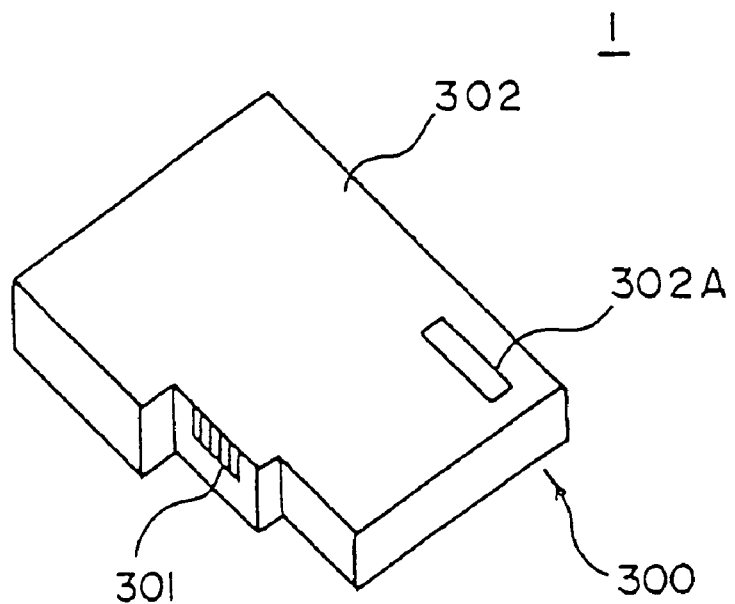
FIG. 11 is an external perspective view of a battery unit of the present invention.

FIG. 11 is an external perspective view of a battery unit employed in the present invention. For ease of explanation, the battery unit shown in FIG. 11 is the same one as the battery unit 1 of the first to fourth embodiments. In this figure, the battery unit 1 is formed by a housing 300 which comprises a terminal unit 301 provided with power supply terminals 9 and 10, and a cover 302 having a window 302A for checking the condition of a fuse 306.

Figure 12:
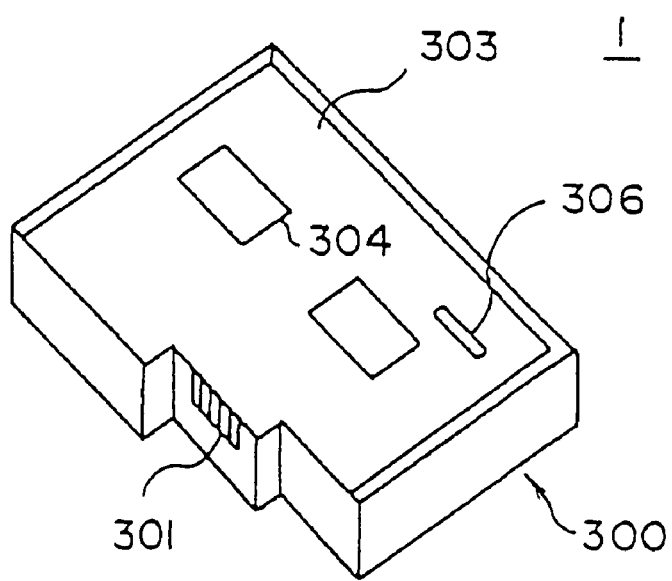
FIG. 12 is a perspective view of the battery unit of FIG. 11 without a cover.

FIG. 12 is a perspective view of the battery unit 1 of FIG. 11 without the cover 302. In this figure, a substrate 303 is provided with an IC chip 304 and the fuse 306, and is connected to a wiring pattern (not shown). The voltage monitor circuit 101 is disposed inside the IC chip 304, for instance.

Figure 13:
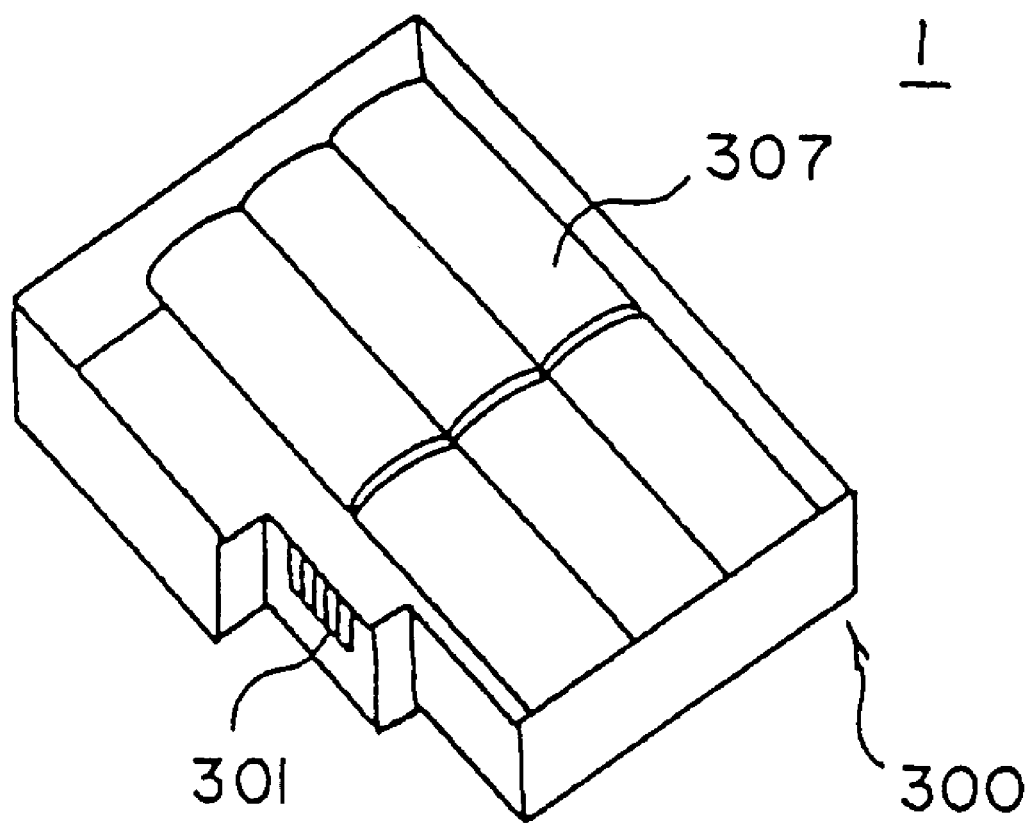
FIG. 13 is a perspective view of the battery unit of FIG. 11 without a substrate.

FIG. 13 is a perspective view of the battery unit 1 of FIG. 11 without the substrate 303. In this figure, battery cells 307 are equivalent to the battery cells E1 to E3. It should be understood here that the shape of the battery unit is not limited to the shape shown in FIGS. 11 to 13, but the battery unit may have any other suitable shape.

The present invention is not limited to the specifically disclosed embodiments, but variations and modifications may be made without departing from the scope of the present invention.

The present application is based on Japanese priority application No. 11-74479, filed on Mar. 18, 1999, the entire contents of which are hereby incorporated for reference.

What is claimed is:

1. A portable electronic device, comprising:
   a load;
   a power supply terminal;
   a control circuit; and
   a battery unit, comprising:
   a plurality of battery cells supplying power to the load via the power supply terminal;
   a monitor circuit to monitor an over-discharging state of the battery cells and to output a first monitor signal;
   a discharge control switch, coupled between the load and the battery cells, switched between ON and OFF states in response to the first monitor signal and to discharge the battery cells in the ON state; and
   a discharge control unit to output a signal which forcibly switches the discharge control switch to the OFF state independently from the first monitor signal, in response to a control signal from the control circuit.

2. The portable electronic device as claimed in claim 1, wherein the discharge control circuit releases the discharge control switch from the OFF state to switch to the ON state in response to a release signal from the control circuit.

3. The portable electronic device as claimed in claim 1, wherein the monitor circuit monitors a charging state of the battery cells and outputs a second monitor signal, and the discharge control circuit releases the discharge control switch from the OFF state to switch to the ON state in response to the second monitor signal.

4. The portable electronic device as claimed in claim 3, wherein the discharge control switch is controlled in response to the first monitor signal after being released from the OFF state in response to the second monitor signal.

5. The portable electronic device as claimed in claim 1, wherein the monitor circuit monitors the over-discharging state of the battery cells when the discharge control switch is held in the OFF state in response to the signal output from the discharge control circuit, and the discharge control circuit releases the discharge control switch from the OFF state in response to the first monitor signal when the monitor circuit monitors the over-discharging state.

6. The portable electronic device as claimed in claim 5, wherein the discharge control switch is controlled in response to the first monitor signal after being released from the OFF state in response to the second monitor signal.

7. The portable electronic device as claimed in claim 1, wherein the monitor circuit releases the discharge control switch from the OFF state when a voltage of any one of the battery cells reaches a predetermined value.

8. The portable electronic device claimed In claim 7, wherein the predetermined value is variable.

\* \* \* \* \*